US 7,872,674 B2

(12) United States Patent
Futamura (10) Patent No.: US 7,872,674 B2
(45) Date of Patent: Jan. 18, 2011

(54) SOLID-STATE IMAGING DEVICE AND METHOD OF OPERATING SOLID-STATE IMAGING DEVICE

(75) Inventor: Fumiaki Futamura, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 966 days.

(21) Appl. No.: 11/724,277

(22) Filed: Mar. 15, 2007

(65) Prior Publication Data

US 2007/0216792 A1    Sep. 20, 2007

(30) Foreign Application Priority Data

Mar. 16, 2006    (JP)    ............... 2006-072164

(51) Int. Cl.
*H04N 5/235*    (2006.01)
*H04N 5/335*    (2006.01)
(52) U.S. Cl. .................... 348/230.1; 348/311
(58) Field of Classification Search ............ None
See application file for complete search history.

(56) References Cited

U.S. PATENT DOCUMENTS 5,309,240 A * 5/1994 Miwada ............... 348/311
6,576,938 B1    6/2003 Hirama et al.
2002/0118291 A1 * 8/2002 Ishigami et al. ......... 348/311

FOREIGN PATENT DOCUMENTS

| JP | 10-271394 | 10/1998 |
|----|-----------|---------|
| JP | 2001-7312 | 1/2001 |
| JP | 2001-244448 | 9/2001 |
| JP | 2002-314883 | 10/2002 |

OTHER PUBLICATIONS

Chinese Patent Office issued a Chinese Office Action dated Oct. 9, 2009, Application No. 2007100885984.

* cited by examiner

*Primary Examiner*—Lin Ye
*Assistant Examiner*—Euel K Cowan
(74) *Attorney, Agent, or Firm*—Young & Thompson (57) ABSTRACT

A solid-state imaging device has: a photo-detection unit; a charge transfer unit transferring charges generated by the photo-detection unit in response to a first and a second clock generated by a clock supply circuit. The charge transfer unit includes: a first charge transfer element; a second charge transfer element adjacent to the first charge transfer element; and a charge transfer element group adjacent to the second charge transfer element and including a plurality of charge transfer elements. In a time period, the clock supply circuit supplies the first clock to the first charge transfer element, the second clock to the second charge transfer element, and constant potentials to respective the plurality of charge transfer elements.

11 Claims, 12 Drawing Sheets

SOLID-STATE IMAGING DEVICE AND METHOD OF OPERATING SOLID-STATE IMAGING DEVICE

BACKGROUND OF THE INVENTION

1. Field of the Invention

The present invention relates to a solid-state imaging device and a method of operating a solid-state imaging device.

2. Description of the Related Art

A solid-state imaging device is a semiconductor device which receives light from an imaging target through an optical system such as a lens, photo-electrically converts the contrast of the received light into quantity of electric charges, sequentially reads the charges, and converts the charge quantity into an electric signal. Such a solid-state imaging device has become widespread with the advancement of semiconductor technology. The widely prevalent solid-state imaging device is provided with a CCD (Charge Coupled Device). When the solid-state imaging device generates the electric signal of an image, the CCD transfers the charges detected by photo-detectors to a circuit for converting the charges into the electric signal.

Since the status of the imaging target is various and a user requires a variety of image qualities, it is preferable that the solid-state imaging device provided with the CCD supports a plurality of resolutions. In other words, it is desirable that the solid-state imaging device is capable of switching the resolution. For example, the following conventional techniques are known.

Japanese Laid Open Patent Application JP-P2002-314883A discloses a solid-state imaging device. The solid-state imaging device has a plurality of optical sensors and a charge transfer register. The plurality of optical sensors are aligned on a semiconductor substrate. The charge transfer register is configured to take and transfer charges generated by the optical sensors in response to received lights. The charge transfer register has a plurality of transfer electrode pairs which are formed on the semiconductor substrate and arranged along a charge transfer path at a certain interval. Each transfer electrode pair consists of a first transfer electrode and a second transfer electrode which are adjacent to each other in the direction of the charge transfer path. The same driving pulse is applied to the first transfer electrode and the second transfer electrode. The solid-state imaging device according to the conventional technique further has a first driving circuit and a second driving circuit. Also, the plurality of transfer electrode pairs include a plurality of groups each consisting of successive four transfer electrode pairs. The first driving circuit applies a driving pulse of the same phase to the first transfer electrode pair and the third transfer electrode pair out of the first to the fourth transfer electrode pairs constituting one group of the transfer electrode pairs. On the other hand, the first driving circuit applies a driving pulse whose phase is opposite to that of the driving pulse applied to the first and the third transfer electrode pairs to the second transfer electrode pair and the fourth transfer electrode pair. Thus, the signal charges are transferred along the above-mentioned charge transfer path. The second driving circuit applies driving pulses of opposite phases to the second transfer electrode pair and the third transfer electrode pair immediately after the signal charges are read out from the optical sensors to the charge transfer register. Meanwhile, the driving pulses applied to respective the first transfer electrode pair and the fourth transfer electrode pair are kept to a constant level. As a result, the signal charges below the third transfer electrode pair are moved to below the first transfer electrode pair along the charge transfer path. According to the above-described conventional technique, the switching of the resolution is possible with a small-scale device configuration.

Japanese Laid Open Patent Application JP-P2003-504972A also discloses a solid-state imaging device. In order to obtain a predetermined resolution at the maximum scanning speed, the solid-state imaging device uses an adding means for adding contents of two adjacent pixels.

Japanese Laid Open Patent Application JP-P2001-7312A also discloses a solid-state imaging device. An object of the conventional technique is to change the resolution without changing wire connections with respect to electrodes. The solid-state imaging device according to the conventional technique is provided with a pixel row and a CCD register. The pixel row consists of a plurality of photoelectric conversion units arranged in a line, each photoelectric conversion unit corresponding to each pixel. Each photoelectric conversion unit generates signal charges due to photoelectric conversion. The CCD register is configured to sequentially transfer the generated signal charges in a predetermined direction. In the solid-state imaging device, the CCD register has a plurality of electrode units each of which is formed on a semiconductor substrate through an insulating film. The solid-state imaging device is further provided with an electrode voltage control means that is capable of selecting any of a first mode and a second mode arbitrarily. In the first mode, pulses of plural phases are sequentially applied to the plurality of electrode units, respectively. While in the second mode, the pulses of plural phases are sequentially applied to electrode units that are located across at least one electrode unit. Moreover, in the second mode, a pulse whose width is narrower than that of the pulses of plural phases, or a direct current voltage is applied to each of the at least one electrode unit sandwiched by the electrode units.

Japanese Laid Open Patent Application JP-A-H10-271394 also discloses a solid-state imaging device. The solid-state imaging device has an electrode structure. The electrode structure consists of a first phase electrode pair and a second phase electrode pair. The first phase electrode pair and the second phase electrode pair are alternately and repeatedly arranged on a transfer channel in a transfer direction. The first phase electrode pairs that sandwich the second phase electrode pair are so wired as to be driven independently of each other. The solid-state imaging device is further provided with a means for applying a direct current voltage to the second phase electrode pair and a means for supplying transfer clocks of opposite phases to respective the first phase electrode pairs that sandwich the second phase electrode pair. In the solid-state imaging device, a charge transfer element which can shorten an output period without changing driving frequency is used as a horizontal transfer register. As a result, the output period of one horizontal line can be reduced and hence the frame rate can be increased.

Figure 1:
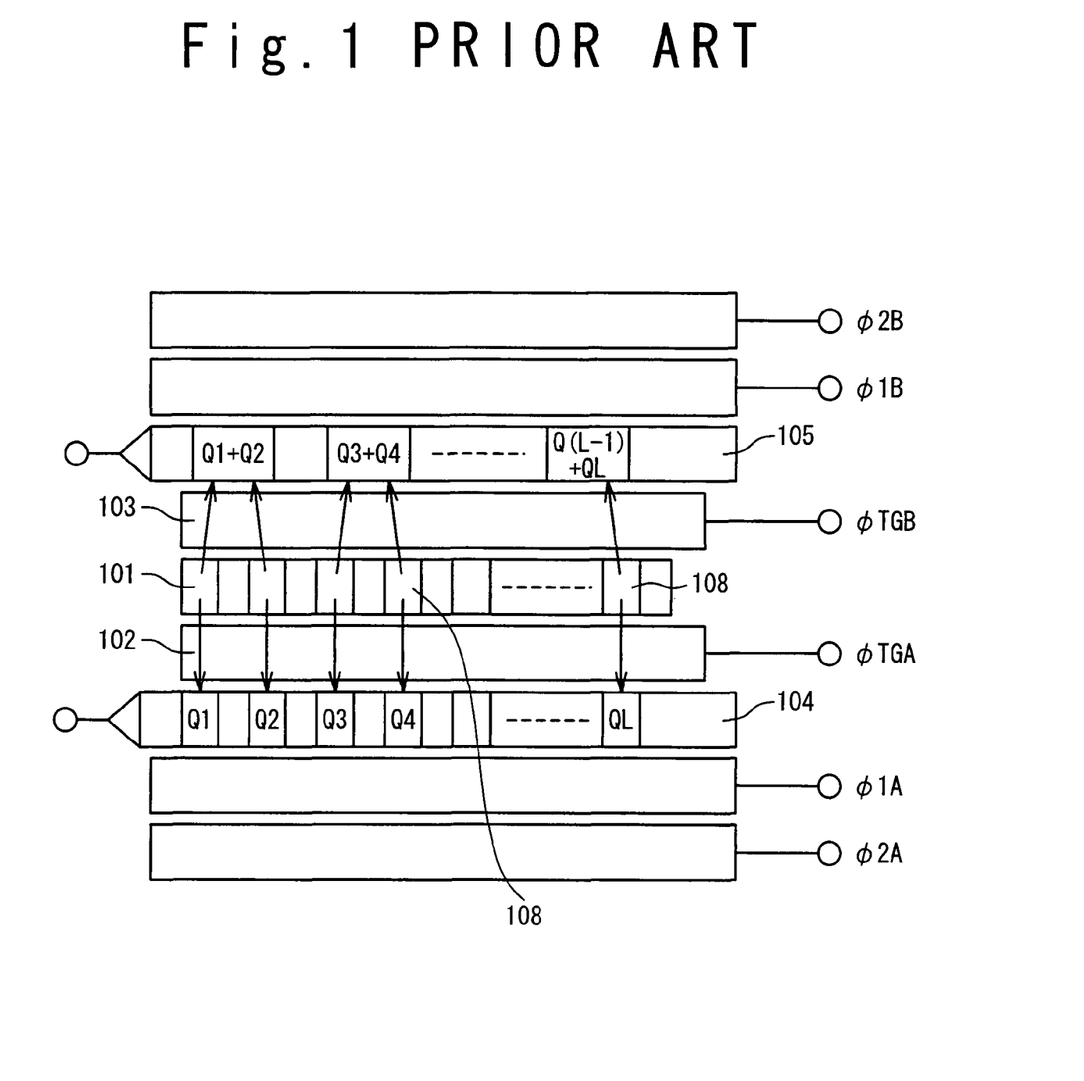
FIG. 1 is a block diagram showing a configuration of a conventional solid-state imaging device.

Moreover, Japanese Laid Open Patent Application JP-P2001-244448A discloses a linear image sensor shown in FIG. 1. As shown in FIG. 1, the linear image sensor is provided with a photo-detection unit 101, a high-resolution mode unit and a low-resolution mode unit. The photo-detection unit 101 includes a large number of photodiodes 108 arranged along a direction. The high-resolution mode unit has a first signal charge read unit 102 located on one side of the photo-detection unit 101 and a first signal charge transfer unit 104 consisting of CCD shift registers. The low-resolution mode unit has a second signal charge read unit 103 located on the other side of the photo-detection unit 101 and a second signal charge transfer unit 105 consisting of CCD shift registers.

Since the linear image sensor is provided with the low-resolution mode unit, the time required for reading out data at low resolution can be reduced. Also, in the present conventional technique, the increase in the cost of a semiconductor chip is prevented by reducing the number of gate pulse interconnections.

As described above, the conventional solid-state imaging device supports the plurality of resolutions. In the case of the low resolution where not all the pixel data are necessary, the data of adjacent pixels are added or the data are added in a floating diffusion region. Also, an overflow drain may be provided. Unnecessary charges are discharged through the overflow drain, and thereby the number of pixels output can be reduced.

The demand in the current information technology society for speeding-up of processing speed is extending over the solid-state imaging device. According to the conventional solid-state imaging device, the processing speed is improved by increasing a clock frequency used in the charge transfer and thereby the time required for the charge transfer is reduced. According to the technique described in the above Japanese Laid Open Patent Application JP-P2001-244448A, the reduction of the charge transfer time is achieved without increasing the clock frequency by providing the CCD dedicated to the low resolution separately from the regular CCD for the normal use.

SUMMARY OF THE INVENTION

The present invention has recognized the following points. A solid-state imaging device of high resolution is manufactured in association with increasing miniaturization of semiconductor manufacturing processes. In such a solid-state imaging device of high resolution, elements constituting the CCD are densely formed. Since the elements are densely arranged, the interval between electrodes of two adjacent elements becomes small and thus a capacitance between the electrodes becomes remarkable. Such a capacitance is referred to as an "inter-phase capacitance" hereinafter. In the conventional solid-state imaging device, the inter-phase capacitance between the transfer electrodes can interfere the speeding-up of the charge transfer. In the solid-state imaging device of high resolution which is widespread in recent years, not only a gate capacitance but also the inter-phase capacitance suppresses the speeding-up of the charge transfer.

Moreover, according the technique described in the above-mentioned Japanese Laid Open Patent Application JP-P2001-244448A, the reduction of the charge transfer time is achieved without increasing the clock frequency by providing the plurality kinds of CCDs. In this case, however, the structure of the solid-state imaging device becomes complicated and thus its manufacturing cost is increased.

It is desirable in the solid-state imaging device to suppress a transfer trouble caused by the inter-phase capacitance between the transfer electrodes and to reduce the time required for the charge transfer.

In an aspect of the present invention, a solid-state imaging device is provided. The solid-state imaging device has: a photo-detection unit configured to generate charges in response to a received light; a charge read-out unit configured to read the generated charges; a charge transfer unit configured to transfer the charges read by the charge read-out unit to a charge detection unit in response to a first clock and a second clock; and a clock supply circuit configured to generate the first clock and the second clock.

In the solid-state imaging device according to the present invention, the charge transfer unit includes: a first charge transfer element; a second charge transfer element adjacent to the first charge transfer element; and a charge transfer element group adjacent to the second charge transfer element and including a plurality of charge transfer elements that are successively arranged and different from the first charge transfer element and the second charge transfer element.

In a first time period, the clock supply circuit supplies the first clock to the first charge transfer element, while supplies the second clock to the second charge transfer element. In addition, the clock supply circuit supplies constant potentials to respective the plurality of charge transfer elements constituting the charge transfer element group. As a result, the number of charge transfer elements relating to the formation of the inter-phase capacitance is reduced, and thus the speeding-up of the charge transfer is achieved.

According to the present invention, it is possible to configure the solid-state imaging device that can suppress the transfer trouble caused by the inter-phase capacitance between the transfer electrodes.

Moreover, according to the present invention, it is possible to configure the solid-state imaging device that can reduce the time required for the charge transfer without complicating the structure of the device. Furthermore, according to the present invention, it is possible to configure the solid-state imaging device that can reduce the time required for the charge transfer without increasing the clock frequency used in the charge transfer.

In other words, since voltage of a part of the transfer electrodes is fixed to a constant voltage, the number of substantial transfer electrodes becomes smaller. Consequently, the time required for the charge transfer can be reduced without increasing the clock frequency (transfer frequency). Moreover, since the number of substantial transfer electrodes is decreased, the electrode capacitance is also reduced. In this case, it becomes easy to make the transfer frequency higher. Therefore, the transfer frequency may be set higher, and such a combination can further reduce the charge transfer time.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A solid-state imaging device according to the embodiments is a two-phase driving type solid-state imaging device. The solid-state imaging device can support and deal with a plurality of operation modes whose resolutions are different from each other. In the following description, an operation mode when an imaging target is imaged with a low resolution is referred to as a "low resolution mode". An operation mode when an imaging target is imaged with a high resolution is referred to as a "high resolution mode". An operation mode when an imaging target is imaged with an intermediate resolution is referred to as an "intermediate resolution mode". The resolution in the intermediate resolution mode is higher than that in the low resolution mode. The resolution in the high resolution mode is higher than that in the intermediate resolution mode.

Figure 2:
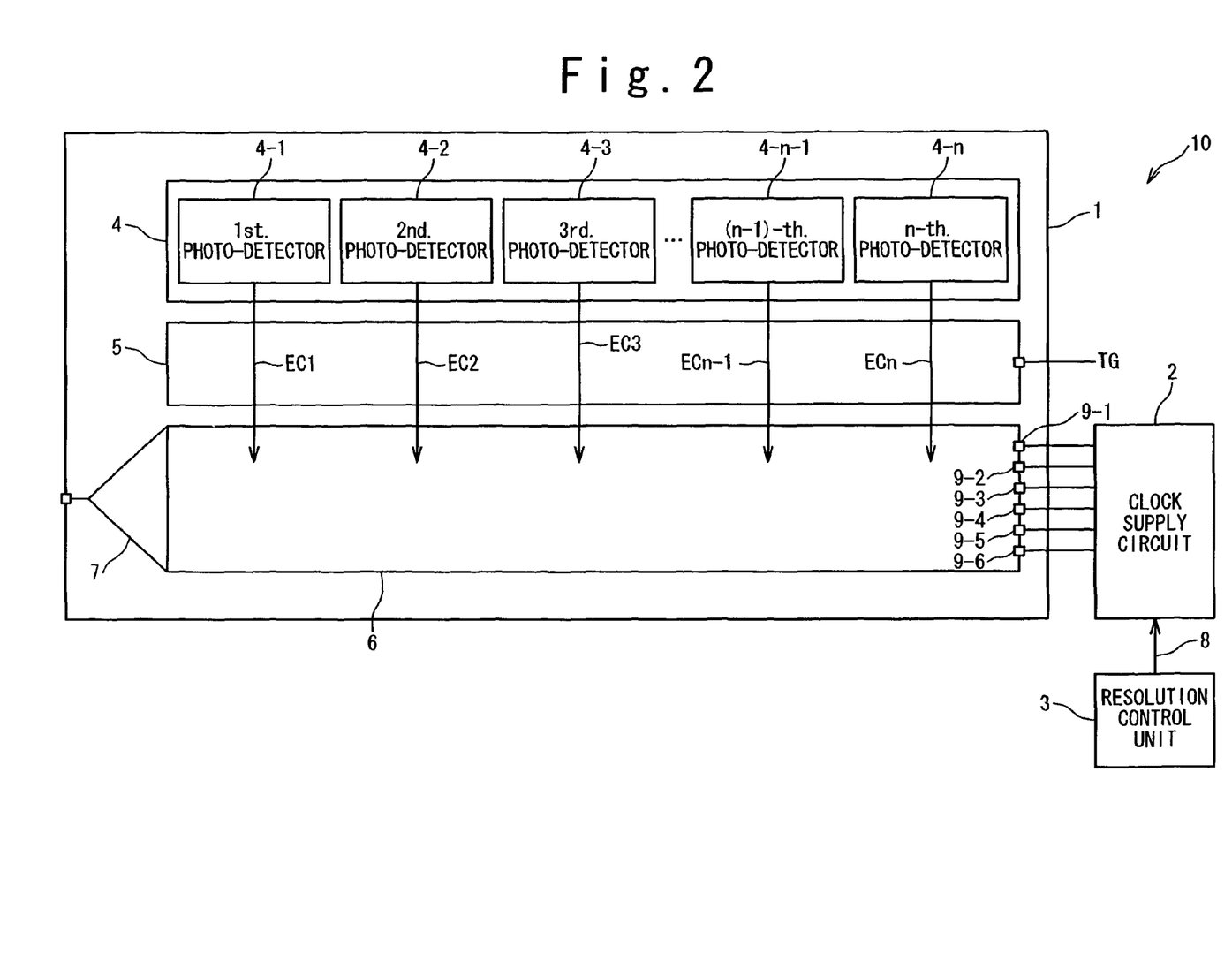
FIG. 2 is a block diagram showing an example of a configuration of a solid-state imaging device according to the present invention.

FIG. 2 is a block diagram showing an example of a configuration of a solid-state imaging device 10 according to the present embodiment. With reference to FIG. 2, the solid-state imaging device 10 according to the present embodiment is provided with an imaging unit 1, a clock supply circuit 2 and a resolution control unit 3. The imaging unit 1 is a semiconductor device which receives a light from an imaging target through a light system (not shown) such as a lens which is installed in an apparatus provided with the solid-state imaging device 10, and outputs an electric signal corresponding to the received light. As shown in FIG. 2, the imaging unit 1 includes a photo-detection unit 4, a charge read-out unit 5, a CCD (charge transfer unit) 6 and an output circuit (charge detection unit) 7.

The clock supply circuit 2 is a circuit block which generates operation clocks and supplies the operation clocks to the CCD 6 of the imaging unit 1. A detailed explanation of the clock supply circuit 2 will be given later. The resolution control unit 3 is a function block which outputs a resolution switch signal 8 to the clock supply circuit 2 in order to switch the operation mode between the low, intermediate and high resolution modes used in the present embodiment.

First, the above-mentioned imaging unit 1 will be explained below in detail. As shown in FIG. 2, the imaging unit 1 includes the photo-detection unit 4, the charge read-out unit 5, the CCD 6 and the output circuit 7. The photo-detection unit 4 has a plurality of photo detectors (photo diodes) 4-1 to 4-n. As shown in FIG. 2, respective photo detectors 4-1 to 4-n generate and store electric charges $EC_1$ to $EC_n$ in response to the received light from the imaging target. The charge read-out unit 5 reads the charges $EC_1$ to $EC_n$ generated by the photo detectors 4-1 to 4-n and transfers the charges $EC_1$ to $EC_n$ to the CCD 6.

The charges $EC_1$ to $EC_n$ read by the charge read-out unit 5 are supplied to the CCD 6. The CCD 6 (charge transfer unit) is a semiconductor device which transfers the charges $EC_1$ to $EC_n$ to the output circuit 7 in response to the clocks output by the clock supply circuit 2. As shown in FIG. 2, the CCD 6 is connected to the clock supply circuit 2 through a plurality of terminals 9-1 to 9-6.

The charges transferred by the CCD 6 are supplied to the output circuit 7. The output circuit 7 (charge detection unit) is a signal generating function block which generates electric signals corresponding to the charges read from the photo-detection unit 4 and transferred by the CCD 6 (charge transfer unit). In other words, the output circuit 7 converts signal charges into signal voltages. The signals generated by the output circuit 7 are output to the outside by an output circuit (not shown) consisting of analog circuits such as a source follower, an inverter and the like.

Figure 3:
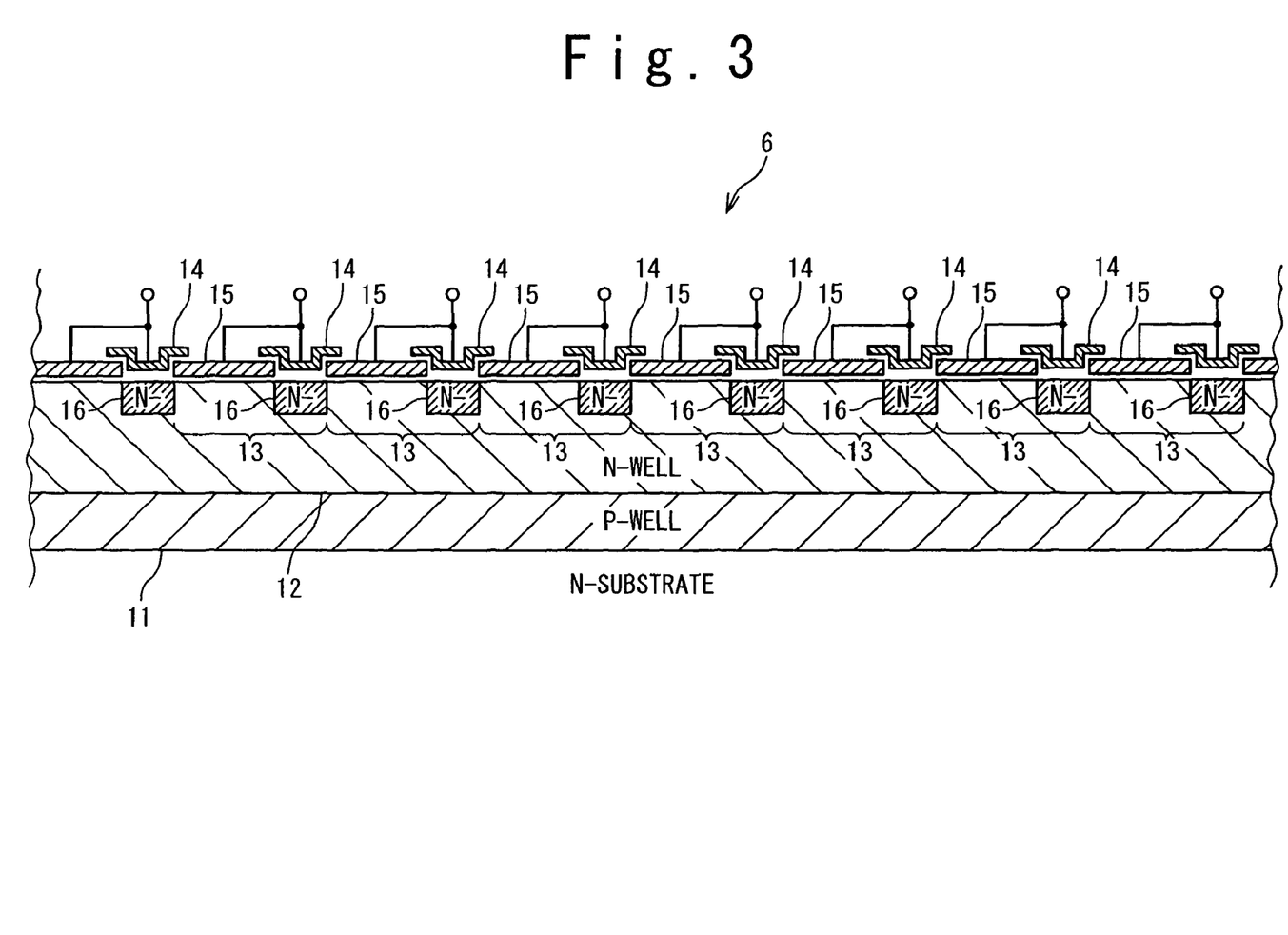
FIG. 3 is a cross-sectional view illustrating an example of a structure of a CCD of the solid-state imaging device.

Next, the above-mentioned CCD 6 will be explained below in detail with reference to the drawings. FIG. 3 is a cross-sectional view illustrating an example of the structure of the CCD 6. As shown in FIG. 3, the CCD 6 has a N-type substrate, a P-type well 11 formed on the N-type substrate, and an N-type well 12 formed on the P-type well 11. Further, the CCD is provided with a plurality of charge transfer elements 13. Each charge transfer element 13 has a plurality of different electrodes that are formed on an insulating film such as an oxide film or the like. More specifically, each charge transfer element 13 has a pair of a barrier electrode (first electrode) 14 and a storage electrode (second electrode) 15. The barrier electrode 14 and the storage electrode 15 included in one charge transfer element 13 are connected to each other. Moreover, each charge transfer element 13 is provided with an $N^-$-region 16 formed by implanting boron or the like into below the barrier electrode 14. By forming the $N^-$-region 16, reverse transfer of the charges can be prevented in the CCD 6. When a plurality of charge transfer elements 13 are described in distinction from each other in the following description, some suffixes will be given to the reference numeral "13".

Figure 4:
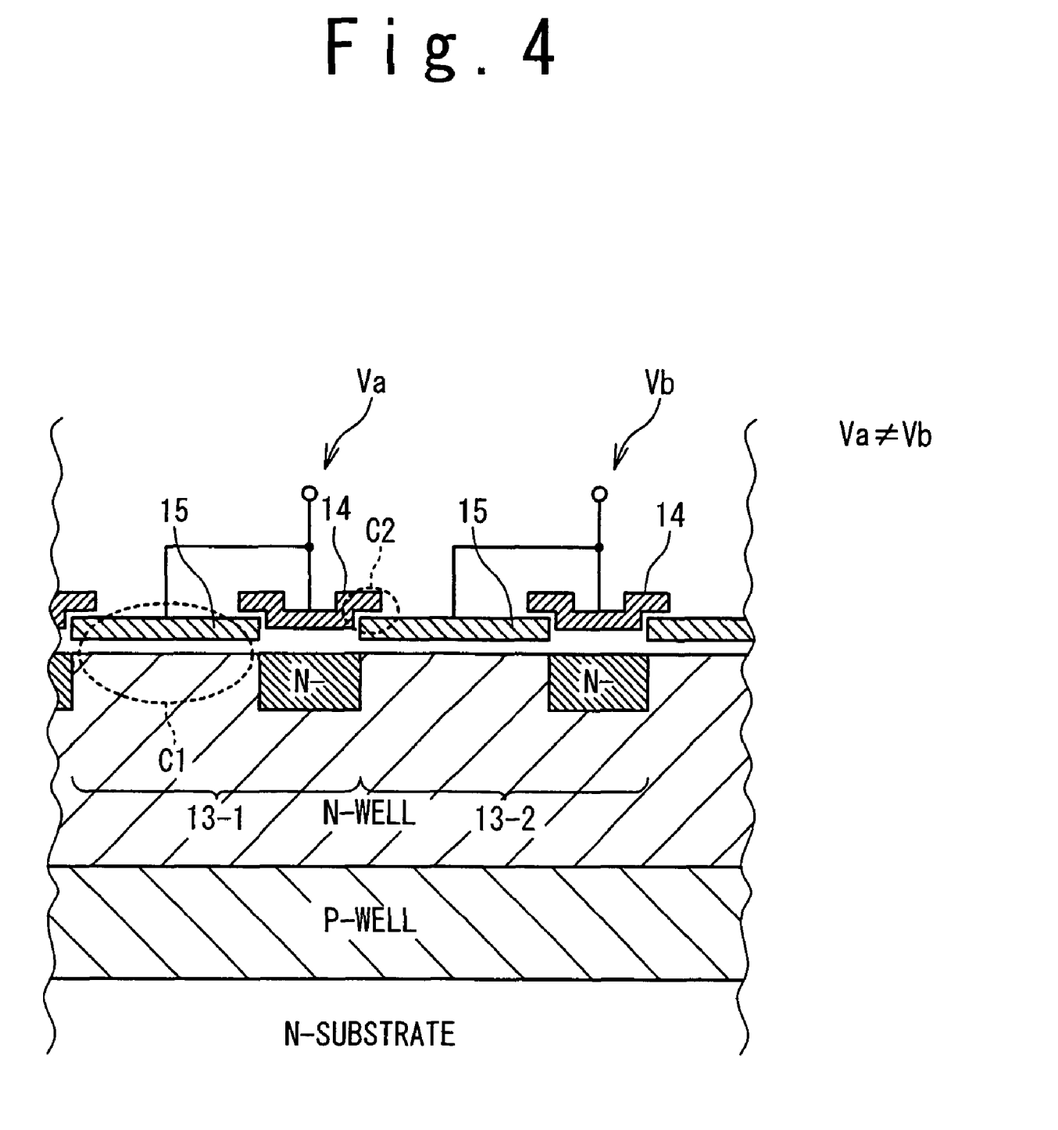
FIG. 4 is a magnified view of the structure illustrated in FIG. 3.

FIG. 4 is a magnified view of a part of the CCD 6 shown in FIG. 3. As described above, the plurality of charge transfer elements 13 constituting the CCD 6 have the same structure. With reference to FIG. 4, a first signal potential Va is applied to the respective electrodes 14, 15 of a first charge transfer element 13-1, while a second signal potential Vb is applied to the respective electrodes 14, 15 of a second charge transfer element 13-2. The first signal potential Va and the second signal potential Vb are different from each other. As shown in FIG. 4, a gate capacitance C1 is generated between the second electrode 15 of the first charge transfer element 13-1 and the N-type well 12. Moreover, an inter-phase capacitance C2 is generated between the first electrode 14 of the first charge transfer element 13-1 and the second electrode 15 of the second charge transfer element 13-2.

Figure 5:
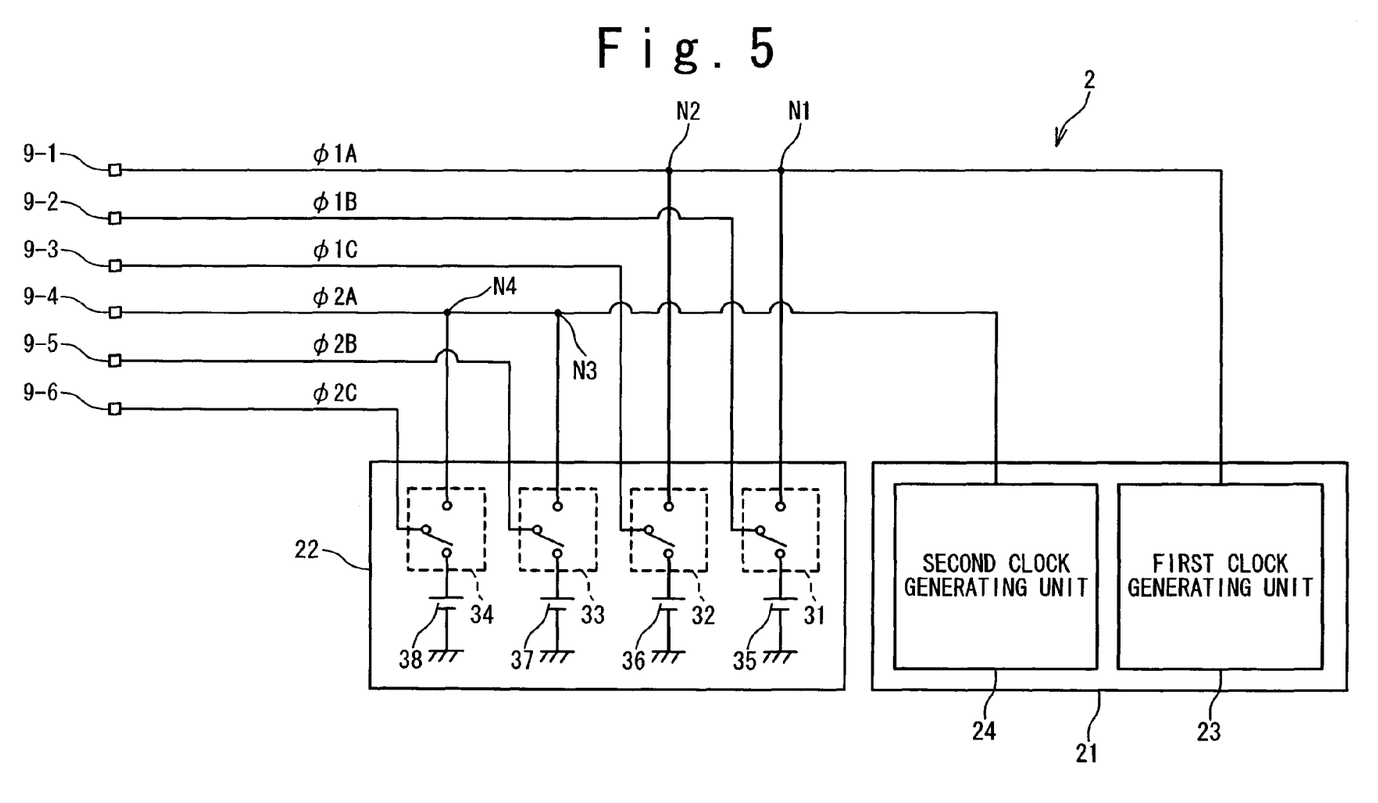
FIG. 5 is a circuit diagram showing a clock supply circuit of the solid-state imaging device according to a first embodiment of the present invention.

Next, the above-mentioned clock supply circuit 2 will be explained below in detail. FIG. 5 is a circuit diagram showing the clock supply circuit 2 according to a first embodiment. The clock supply circuit 2 according to the present embodiment has a clock generating unit 21, a resolution switch unit 22 connected to the clock generating unit 21, and a plurality of signal lines ($\phi 1A$ to $\phi 1C$, $\phi 2A$ to $\phi 2C$). As shown in FIG. 5, the first signal line $\phi 1A$ is connected through the first terminal 9-1 to the above-mentioned CCD 6 of the imaging unit 1. Similarly, the second signal line $\phi 1B$ is connected through the second terminal 9-2 to the CCD 6, the third signal line $\phi 1C$ is connected through the third terminal 9-3 to the CCD 6, the fourth signal line $\phi 2A$ is connected through the fourth terminal 9-4 to the CCD 6, the fifth signal line $\phi 2B$ is connected through the fifth terminal 9-5 to the CCD 6, and the sixth signal line $\phi 2C$ is connected through the sixth terminal 9-6 to the CCD 6.

With reference to FIG. 5, the clock generating unit 21 includes a first clock generating unit 23 and a second clock generating unit 24. The first clock generating unit 23 and the second clock generating unit 24 are clock generators for generating the clocks to be supplied to the CCD 6. The first clock generating unit 23 generates and outputs a first clock (first driving pulses) to the first signal line φ1A, while the second clock generating unit 24 generates and outputs a second clock (second driving pulses) to the fourth signal line φ2A. Described in the following explanation is a case where the second clock is an inversion clock of the first clock, namely, the phase of the first clock and the phase of the second clock are opposite to each other. The second clock may be generated by inverting the first clock.

The resolution switch unit 22 includes a plurality of switches 31 to 34 and a plurality of direct current power sources 35 to 38. As shown in FIG. 5, the first switch 31 connects the second signal line φ1B and the first direct current power source 35 or connects the second signal line φ1B and a first node N1 on the first signal line φ1A. Similarly, the second switch 32 connects the third signal line φ1C and the second direct current power source 36 or connects the third signal line φ1C and a second node N2 on the first signal line φ1A. The third switch 33 connects the fifth signal line φ2B and the third direct current power source 37 or connects the fifth signal line φ2B and a third node N3 on the fourth signal line φ2A. The fourth switch 34 connects the sixth signal line φ2C and the fourth direct current power source 38 or connects the sixth signal line φ2C and a fourth node N4 on the fourth signal line φ2A. In the present embodiment, the plurality of switches 31 to 34 carry out switching operation in accordance with the resolution switch signal 8 supplied from the resolution control unit 3. Each of the switches 31 to 34 switches the operation between the supply of the clock to the CCD 6 and the supply of a constant potential signal to the CCD 6. In other words, the resolution switch unit 22 switches the operation modes (low, intermediate, and high resolution modes) in response to the resolution switch signal 8.

Figure 6:
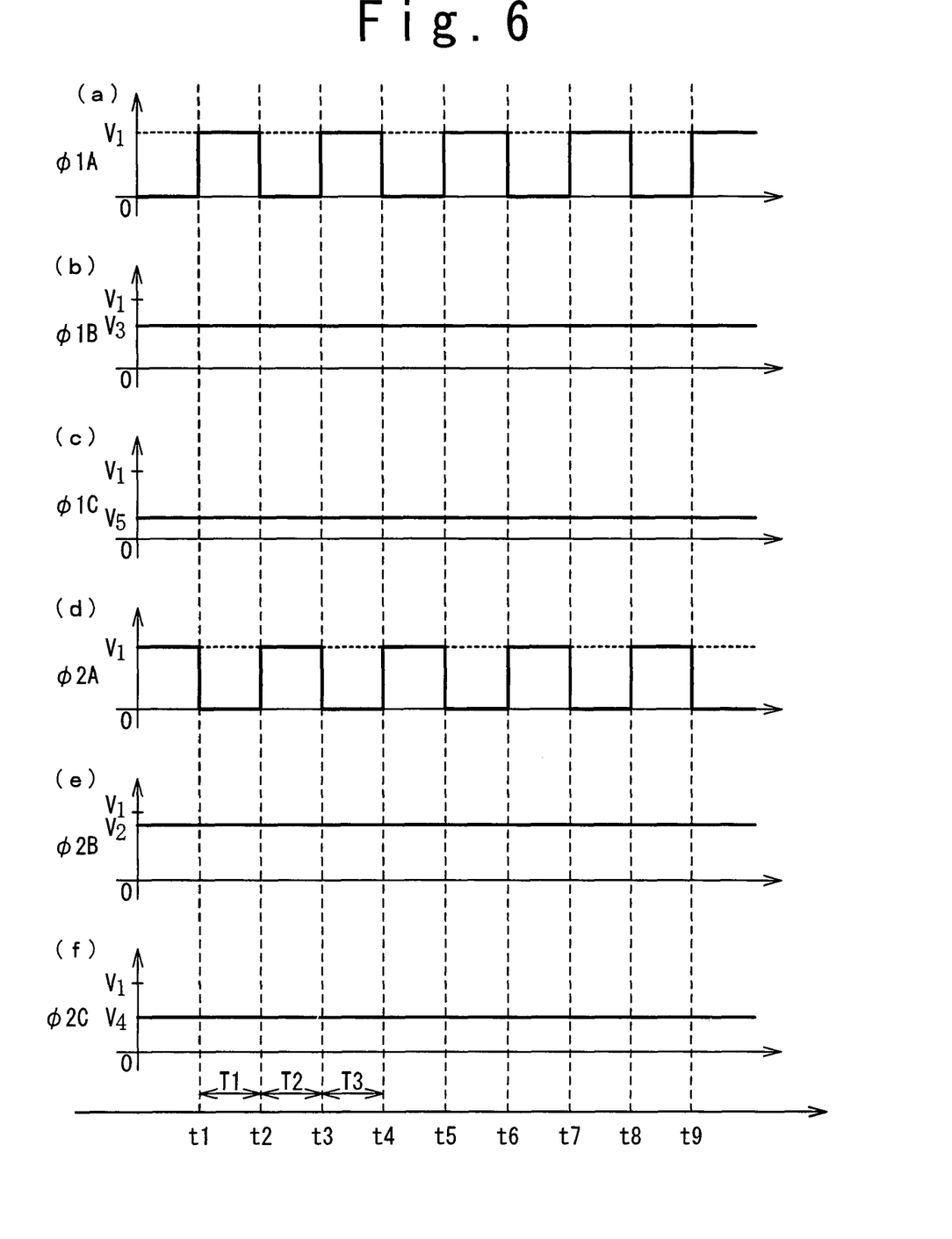
FIG. 6 is a timing chart showing a time variation of potentials of signal lines.

FIG. 6 is a timing chart showing a time variation of potentials of the respective signal lines (φ1A to φ1C, φ2A to φ2C) in the clock supply circuit 2 during the low resolution mode. In FIG. 6, the chart (a) shows a waveform of the potential of the first signal line φ1A. The chart (b) shows a waveform of the potential of the second signal line φ1B when the second signal line φ1B and the first direct current power source 35 are connected by the first switch 31. The chart (c) shows a waveform of the potential of the third signal line φ1C when the third signal line φ1C and the second direct current power source 36 are connected by the second switch 32. The chart (d) shows a waveform of the potential of the fourth signal line φ2A. The chart (e) shows a waveform of the potential of the fifth signal line φ2B when the fifth signal line φ2B and the third direct current power source 37 are connected by the third switch 33. The chart (f) shows a waveform of the potential of the sixth signal line φ2C when the sixth signal line φ2C and the fourth direct current power source 38 are connected by the fourth switch 34. As shown in FIG. 6, the first clock (first driving pulses) is supplied to the first signal line φ1A, and the second clock (second driving pulses) is supplied to the fourth signal line φ2A. On the other hand, signals of constant potentials (V3, V5, V2, and V4; V2>V3>V4>V5) are supplied to the second signal line φ1B, the third signal line φ1C, the fifth signal line φ2B, and the sixth signal line φ2C, respectively.

It should be noted that amplitudes of the first clock and the second clock in the low resolution mode is set larger than those in the high resolution mode where charges of all the pixels are transferred, if the amplitudes in the high-resolution mode are insufficient for obtaining the potentials of the second signal line φ1B, the third signal line φ1C, the fifth signal line φ2B and the sixth signal line φ2C shown in FIG. 6. It should be also noted that a potential (voltage) higher than the above-mentioned constant potential V3, V5, V2, and V4 may be applied to the charge transfer elements 13 of the CCD 6 before the operation of the CCD 6, namely, when the charges are supplied from the charge read-out unit 5 to the CCD 6.

Figure 7:
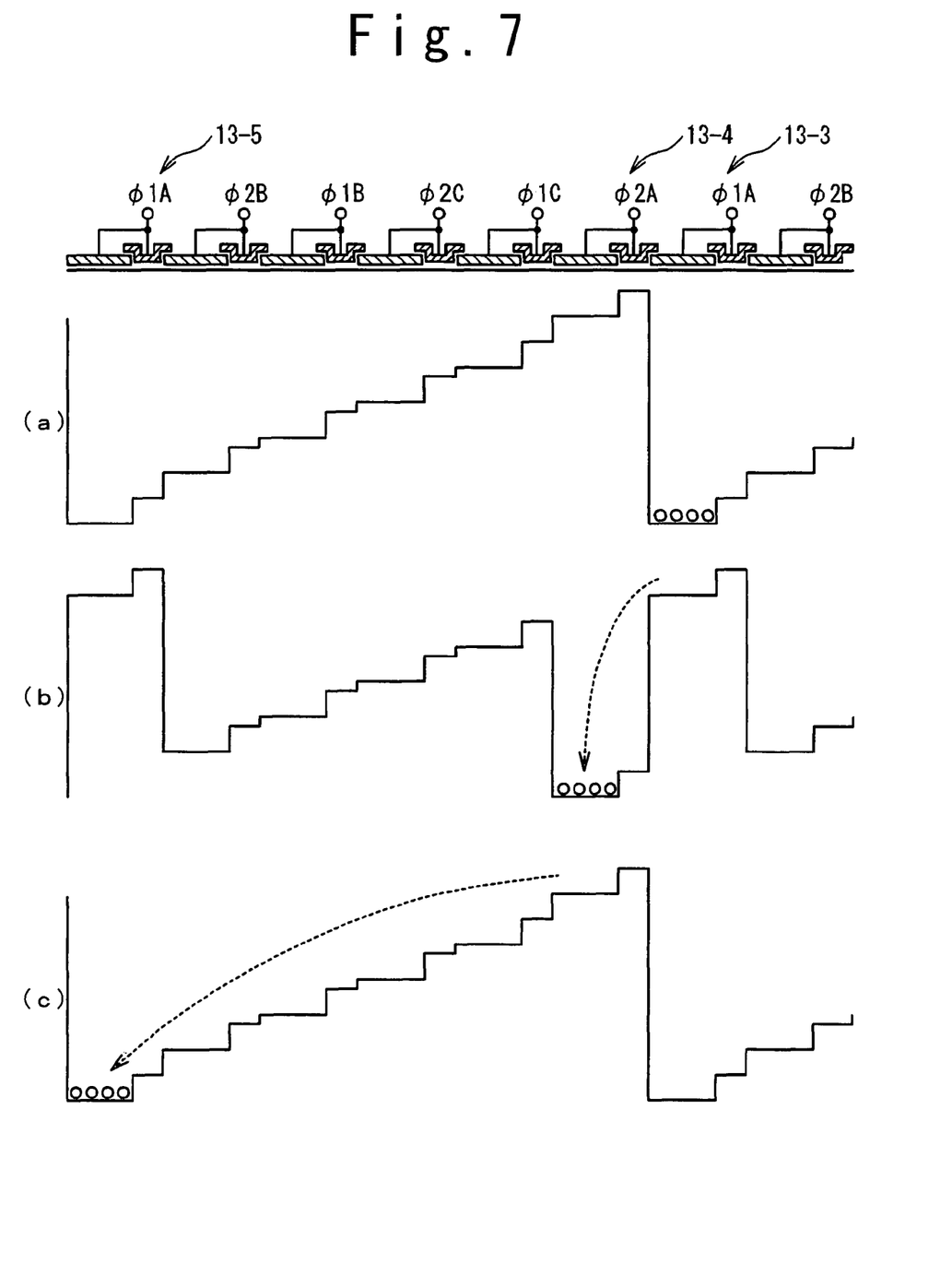
FIG. 7 conceptually shows a charge transfer in the CCD according to the first embodiment.

The charge transfer during the low resolution mode where the signals shown in FIG. 6 are supplied to the CCD 6 will be explained below. FIG. 7 conceptually shows the charge transfer by the CCD 6 in the low resolution mode. Shown in FIG. 7 are potential states and potential well of the respective charge transfer elements 13 in the CCD 6. The column (a) shows the charge transfer state of the CCD 6 during a period T1 from a time t1 to a time t2 shown in FIG. 6. Similarly, the column (b) shows the charge transfer state of the CCD 6 during a period T2 from the time t2 to a time t3. The column (c) shows the charge transfer state of the CCD 6 during a period T3 from the time t3 to a time t4.

With reference to FIG. 7, the first clock is supplied to a third charge transfer element 13-3 and a fifth charge transfer element 13-5 through the signal line φ1A. The second clock is supplied to a fourth charge transfer element 13-4 through the signal line φ2A. Moreover, the constant potentials (V5, V4, V3, and V2; V5<V4<V3<V2) are supplied to the charge transfer elements 13 between the fourth charge transfer element 13-4 and the fifth charge transfer element 13-5 through the signal lines φ1C, φ2C, φ1B, and φ2B, respectively. Such the charge transfer elements 13 to which the constant potentials are applied may be referred to as a "charge transfer element group" hereinafter.

As shown in FIG. 7, the fourth charge transfer element 13-4 is adjacent to the third charge transfer element 13-3. The charge transfer element group is adjacent to the fourth charge transfer element 13-4 on the opposite side of the third charge transfer element 13-3. The charge transfer element 13-5 is adjacent to the charge transfer element group on the opposite side of the fourth charge transfer element 13-4. In the present example shown in FIG. 7, the charge transfer element group consists of four charge transfer elements 13 between the fourth charge transfer element 13-4 and the fifth charge transfer element 13-5. The same first clock is supplied to the third charge transfer element 13-3 and the fifth charge transfer element 13-5.

In the period T1, the first clock (first driving pulse) is High level, while the second clock (second driving pulse) is Low level (see FIG. 6). Therefore, the charges are accumulated in the third charge transfer element 13-3 (see column (a) in FIG. 7). In the period T2, the first clock becomes Low level (inverted signal of the signal during the period T1), while the second clock becomes High level (inverted signal of the signal during the period T1). In this case, a first potential V1 is applied to the fourth charge transfer element 13-4 through the fourth signal line φ2A, while 0 V is applied to the third charge transfer element 13-3 through the first signal line φ1A. Therefore, when the period changes from T1 to T2, the charges accumulated in the third charge transfer element 13-3 are transferred to the fourth charge transfer element 13-4 (see column (b) in FIG. 7).

In the period T3, the first clock becomes High level, while the second clock becomes Low level (see FIG. 6). As described above, from the time t1 to t4, the signals of the constant potentials are respectively applied to the charge transfer elements 13 other than the charge transfer elements 13 to which the first clock and the second clock are applied. In other words, the DC potentials (V5<V4<V3<V2) shown in FIG. 6 are respectively applied to the four charge transfer elements provided between the fourth charge transfer element 13-4 and the fifth charge transfer element 13-5. Therefore, as shown in the column (c) in FIG. 7, the charges accumulated in the fourth charge transfer element 13-4 in the period T2 are transferred through the four charge transfer elements to the fifth charge transfer element 13-5 in the period T3.

In this manner, the CCD 6 according to the present embodiment can transfer the charges from the charge transfer element 13-3 to the charge transfer element 13-5 in one cycle of the operation clock during the low resolution mode. That is to say, the CCD 6 can move forward the charges over the six charge transfer elements in one cycle of the operation clock. The electrode capacitance in the foregoing operations will be described below.

Figure 8:
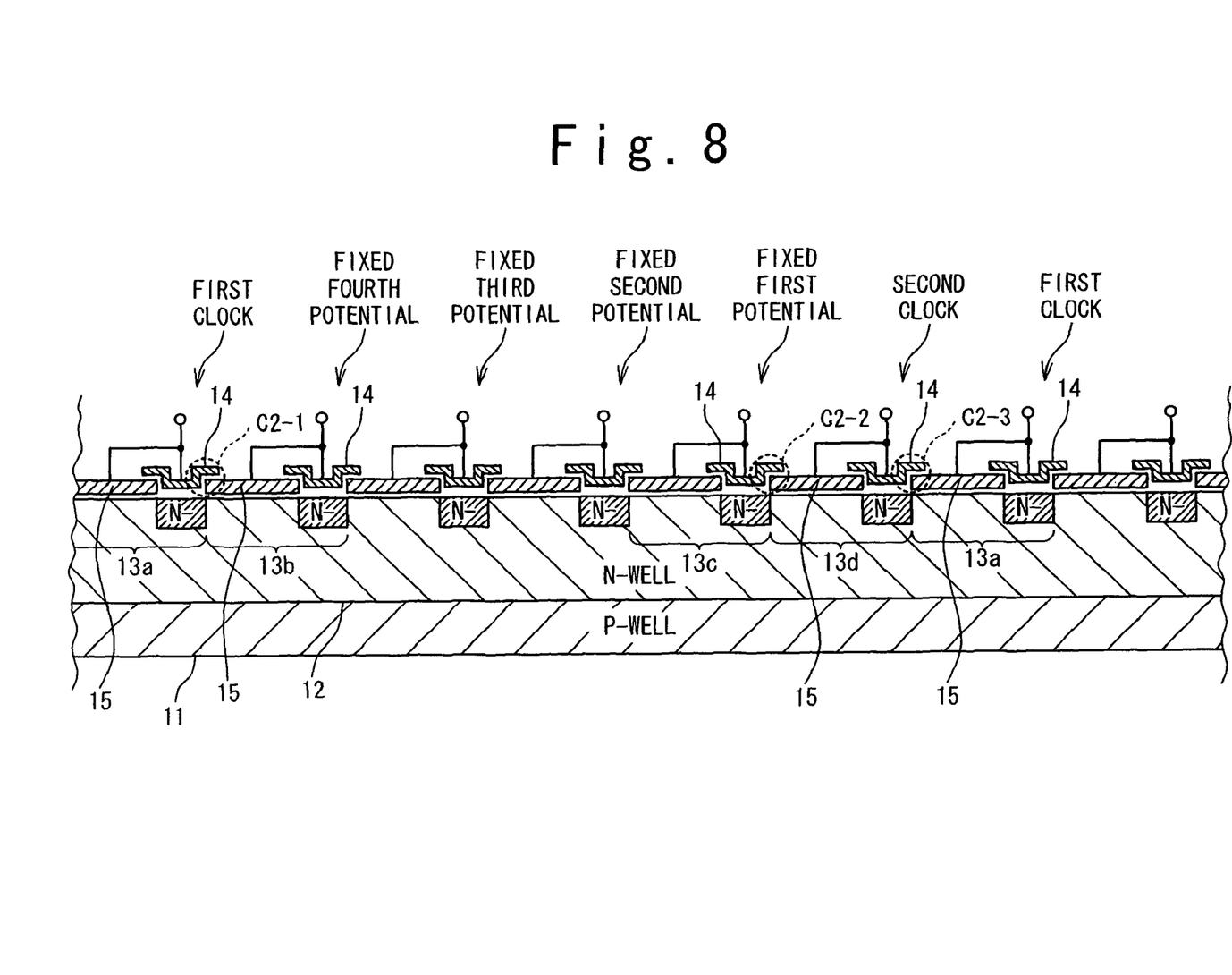
FIG. 8 is a cross-sectional view showing electrode capacitances in the CCD.

FIG. 8 is a cross-sectional view showing the electrode capacitances in the CCD 6 when the operations shown in FIG. 7 are executed. With reference to FIG. 8, the first clock is supplied to a first charge transfer element 13a. A fixed fourth potential is supplied to a second charge transfer element 13b adjacent to the first charge transfer element 13a. Also, a fixed first potential is supplied to a third charge transfer element 13c. The second clock is supplied to a fourth charge transfer element 13d adjacent to the third charge transfer element 13c. Moreover, the first clock is supplied to the first charge transfer element 13a adjacent to the fourth charge transfer element 13d. The above-mentioned charge transfer element group includes the charge transfer elements 13b and 13c between the charge transfer elements 13a and 13d.

As shown in FIG. 8, a first inter-phase capacitance C2-1 is generated between the first electrode 14 of the first charge transfer element 13a and the second electrode 15 of the second charge transfer element 13b. A second inter-phase capacitance C2-2 is generated between the first electrode 14 of the third charge transfer element 13c and the second electrode 15 of the fourth charge transfer element 13d. A third inter-phase capacitance C2-3 is generated between the first electrode 14 of the fourth charge transfer element 13d and the second electrode 15 of the first charge transfer element 13a.

As mentioned above, the constant potentials are respectively applied to the electrodes of the second charge transfer element 13b and the third charge transfer element 13c. Also, the first clock is applied to the first charge transfer element 13a, and the second clock is applied to the fourth charge transfer element 13d. In this case, a ratio of the first inter-phase capacitance C2-1, the second inter-phase capacitance C2-2 and the third inter-phase capacitance C2-3 when the CCD 6 is operating is as follows; "the first inter-phase capacitance C2-1:the second inter-phase capacitance C2-2:the third inter-phase capacitance C2-3=1:1:2". Here, let us consider a group of the charge transfer elements 13 from a certain first charge transfer element 13a to the next charge transfer element 13a. When the first inter-phase capacitance C2-1 as a reference is "1", the inter-phase capacitance Ca of the group is "4".

On the other hand, according to the conventional solid-state imaging device, for example, according to the technique described in the above-mentioned patent document: Japanese Laid Open Patent Application JP-A-H10-271934, the inter-phase capacitance Cb of the group including the same number of charge transfer elements is "6". The inter-phase capacitance Ca of the group according to the present embodiment is smaller than the inter-phase capacitance Cb of the conventional technique. The inter-phase capacitance can interfere the speeding-up of the charge transfer. It is thus possible according to the present embodiment to reduce the inter-phase capacitance which can interfere the speeding-up of the charge transfer. As a result, the speeding-up of the charge transfer can be achieved and hence the time required for the charge transfer can be reduced without increasing the clock frequency.

Next, a second embodiment of the present invention will be described below with reference to the drawings. As in the first embodiment, the solid-state imaging device 10 in the second embodiment operates with switching the plurality of resolutions. In the present embodiment, the same reference numerals are given to the same components as those described in the first embodiment, and an overlapping description will be appropriately omitted.

Figure 9:
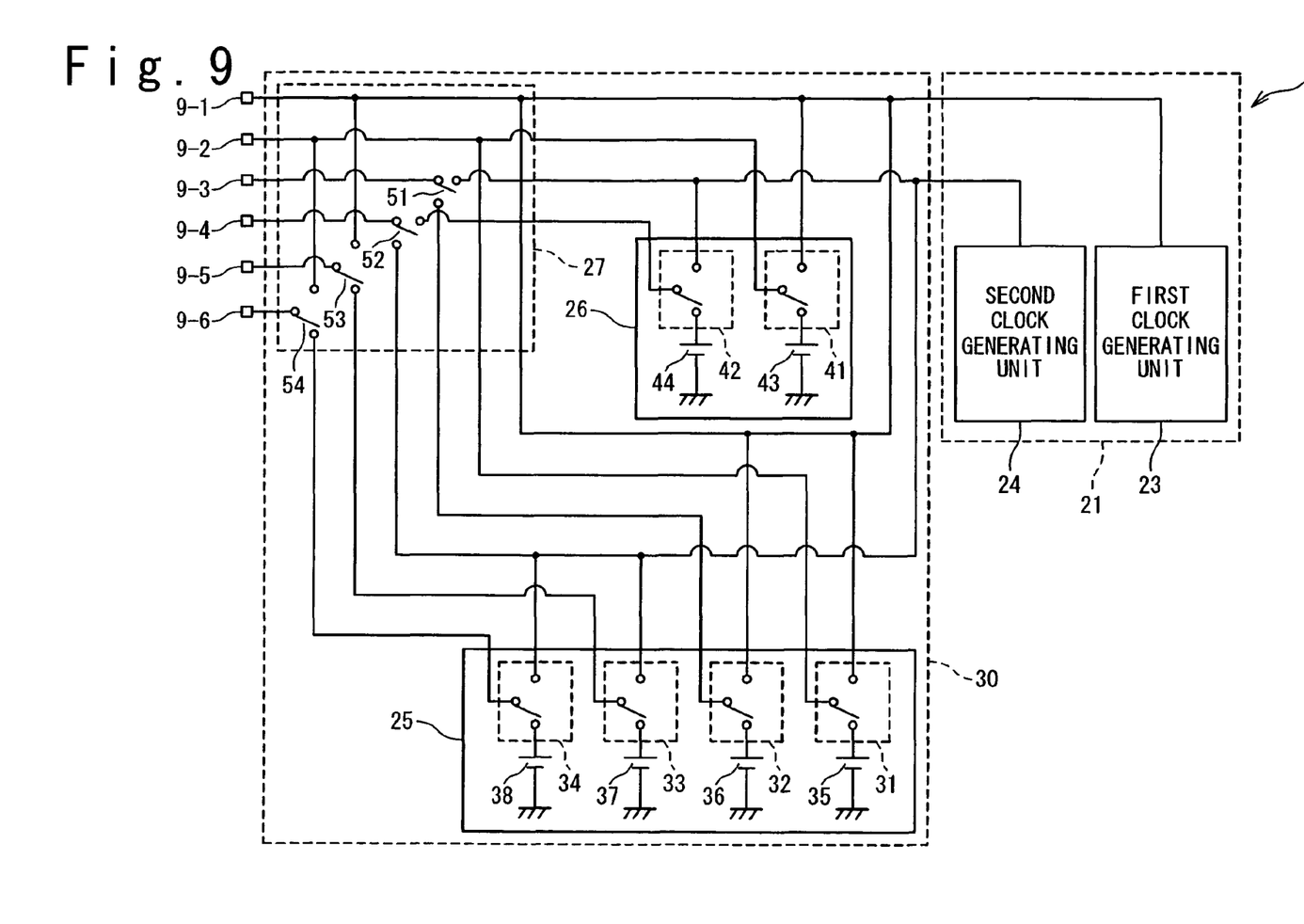
FIG. 9 is a circuit diagram showing a clock supply circuit of the solid-state imaging device according to a second embodiment of the present invention.

FIG. 9 is a circuit diagram showing an example of the clock supply circuit 2 according to the second embodiment. The clock supply circuit 2 in the present embodiment has a resolution switch unit 30 connected to the clock generating unit 21. As shown in FIG. 9, the resolution switch unit 30 is provided with a low resolution unit 25, an intermediate resolution unit 26 and a switch unit 27. The low resolution unit 25 is configured similarly to the resolution switch unit 22 in the first embodiment. The intermediate resolution unit 26 includes a fifth switch 41 and a sixth switch 42. As shown in FIG. 9, the fifth switch 41 connects the first clock generating unit 23 or a fifth direct current power source 43 to the second terminal 9-2. Similarly, the sixth switch 42 connects the second clock generating unit 24 or a sixth direct current power source 44 to the fourth terminal 9-4.

The switch unit 27 includes a plurality of switches 51 to 54. As shown in FIG. 9, a seventh switch 51 connects the second clock generating unit 24 or the second switch 32 to the third terminal 9-3. An eighth switch 52 connects the sixth switch 42 or the second clock generating unit 24 to the fourth terminal 9-4. A ninth switch 53 connects the first clock generating unit 23 or the third switch 33 to the fifth terminal 9-5. A tenth switch 54 connects the fifth switch 41 or the fourth switch 34 to the sixth terminal 9-6.

The clock supply circuit 2 in the second embodiment switches the above-mentioned plurality of switches (31 to 34, 41 to 42 and 51 to 54) in response to the resolution switch signal 8 supplied from the resolution control unit 3. Thereby, the clock supply circuit 2 controls the signal potentials (voltages) that are applied to the electrodes of the charge transfer elements 13 in the CCD 6. A case where the solid-state imaging device 10 operates in the intermediate resolution mode in response to the resolution switch signal 8 will be described below. When the solid-state imaging device 10 operates in the intermediate resolution mode, the seventh switch 51 of the switch unit 27 connects the third terminal 9-3 and the second clock generating unit 24. Also, the eighth switch 52 connects the fourth terminal 9-4 and the sixth switch 42, and the ninth switch 53 connects the fifth terminal 9-5 and the first clock generating unit 23. Moreover, the tenth switch 54 connects the sixth terminal 9-6 and the fifth switch 41.

At this time, the fifth switch 41 connects the second terminal 9-2 and the fifth direct current power source 43. The sixth switch 42 connects the fourth terminal 9-4 and the sixth direct current power source 44. As a result, the signal line serving as the third signal line φ1C in the above-described low resolution mode serves as the fourth signal line φ2A in the intermediate resolution mode. The signal line serving as the fourth signal line φ2A in the above-described low resolution mode serves as the fifth signal line φ2B in the intermediate resolution mode. The signal line serving as the fifth signal line φ2B in the above-described low resolution mode serves as the first signal line φ1A in the intermediate resolution mode. The signal line serving as the sixth signal line φ2C in the above-described low resolution mode serves as the second signal line φ1B in the intermediate resolution mode. Consequently, the number of the charge transfer elements 13 to which the constant potentials are supplied becomes two, and the first clock or second clock is supplied to the charge transfer element 13 other than them.

Figure 10:
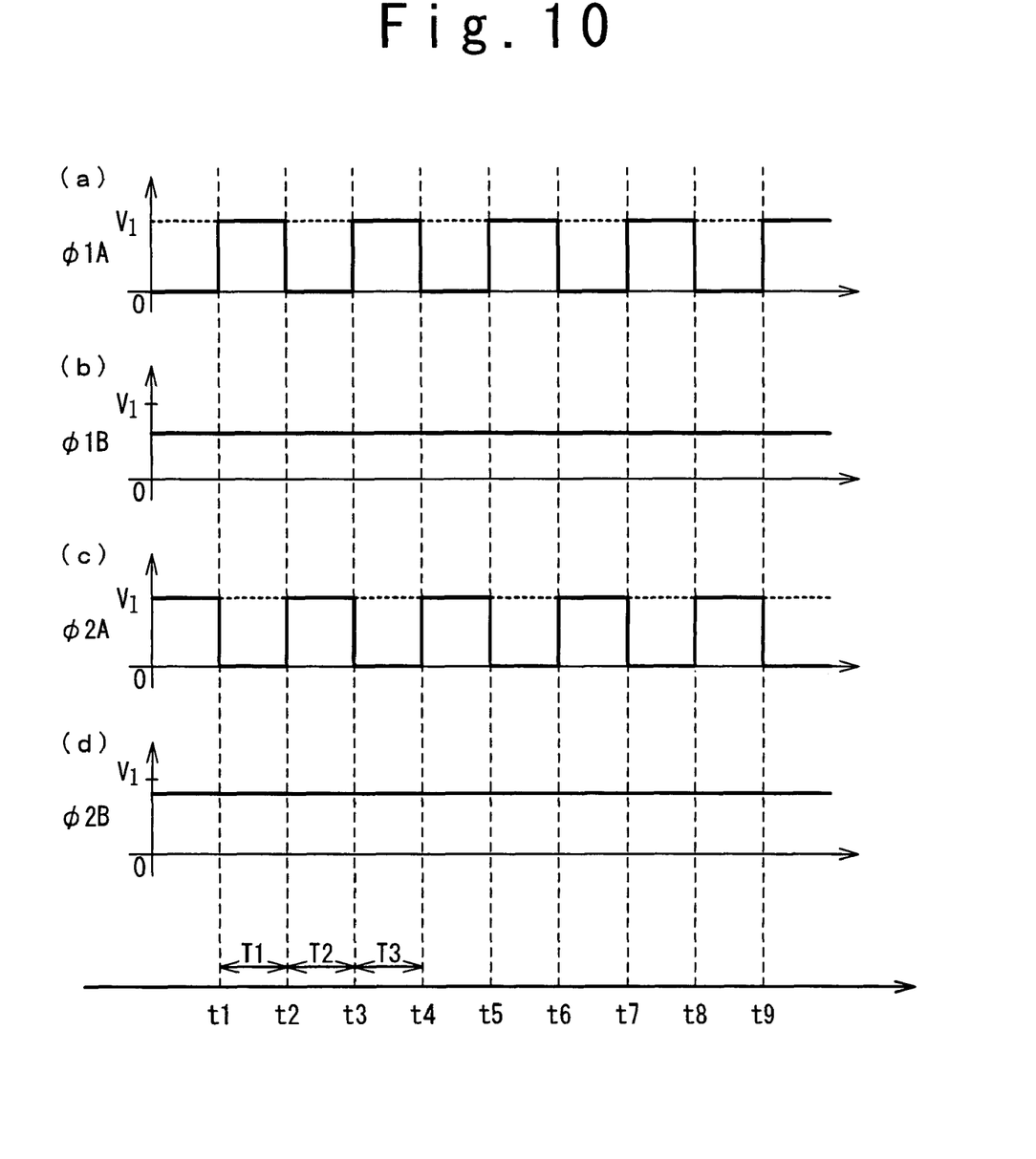
FIG. 10 is a timing chart showing a time variation of potentials of signal lines in an intermediate resolution mode.

Operations during the intermediate resolution mode will be described below with reference to FIG. 10. FIG. 10 is a timing chart showing the operations in the intermediate resolution mode. The chart (a) in FIG. 10 shows the potential of the first signal line φ1A in the intermediate resolution mode. The chart (b) in FIG. 10 shows the potential of the second signal line φ1B in the intermediate resolution mode. The chart (c) in FIG. 10 shows the potential of the fourth signal line φ2A in the intermediate resolution mode. The chart (d) in FIG. 10 shows the potential of the fifth signal line φ2B in the intermediate resolution mode.

As shown in FIG. 10, the potential of the second signal line φ1B is smaller than the potential of the fifth signal line φ2B. Also, the potential (V1) at the time when the first clock or the second clock is at the High level is higher than the potentials of the second signal line T1B and the fifth signal line φ2B. As shown in FIG. 10, the first clock and the second clock whose phase is opposite to that of the first clock are supplied to the first signal line φ1A and the fourth signal line φ2A, respectively.

Figure 11:
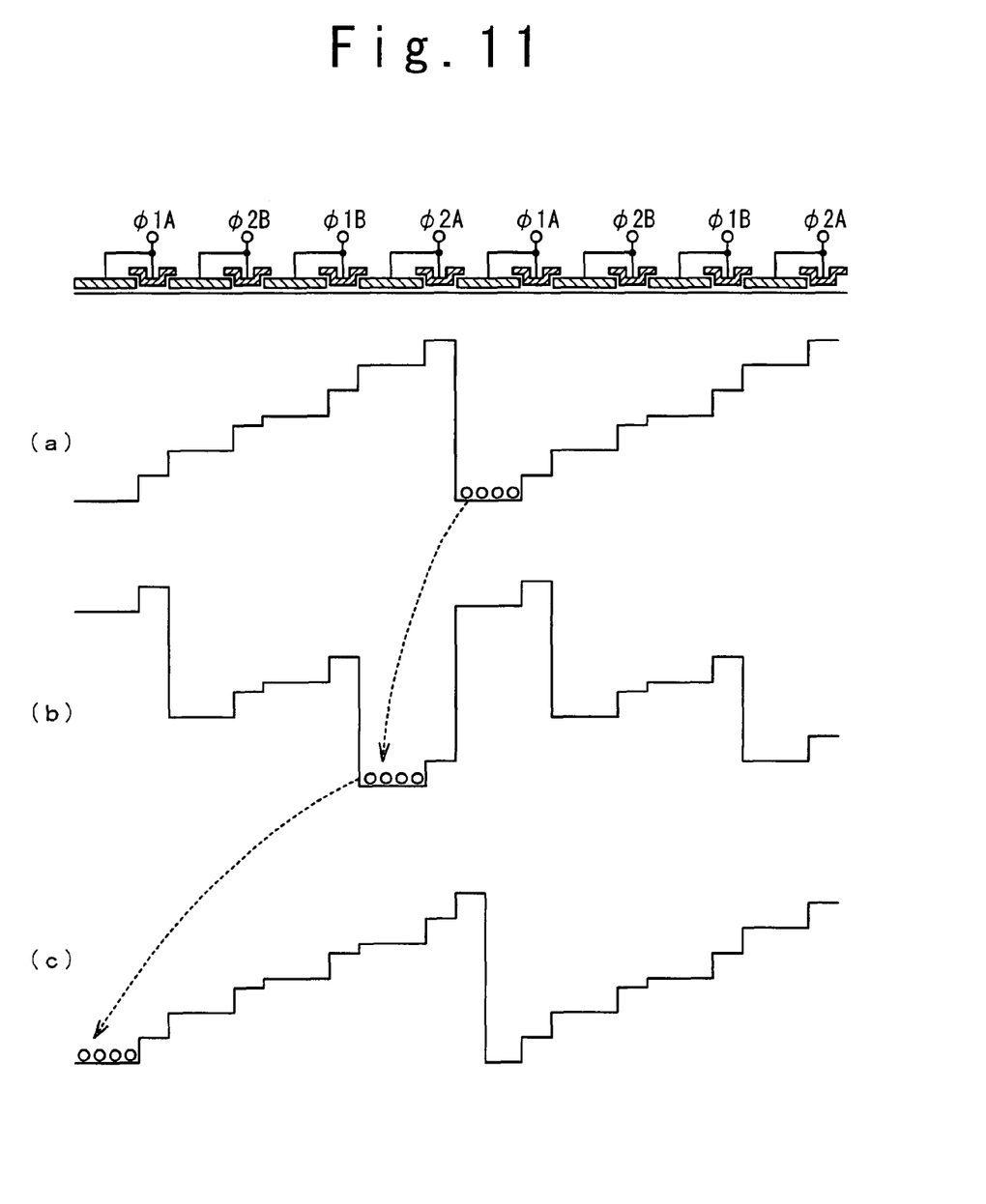
FIG. 11 conceptually shows a charge transfer in the intermediate resolution mode.

The charge transfer when the above-mentioned signal potentials are supplied to the CCD 6 will be described below with reference to FIG. 11. FIG. 11 corresponds to the foregoing FIG. 7 and conceptually shows the charge transfer by the CCD 6 in the intermediate resolution mode. The column (a) shows the charge transfer state of the CCD 6 during a period T1 from a time t1 to a time t2 shown in FIG. 10. Similarly, the column (b) shows the charge transfer state of the CCD 6 during a period T2 from the time t2 to a time t3. The column (c) shows the charge transfer state of the CCD 6 during a period T3 from the time t3 to a time t4. In the present example, the charge transfer element group consists of two charge transfer elements 13.

As shown in FIG. 11, the charges stored in a charge transfer element 13 to which the first clock is applied in the period T1 are transferred in the period T2 to the next charge transfer element 13 connected to the fourth signal line φ2A. Further, the charges stored in the charge transfer element 13 connected to the fourth signal line φ2A in the period T2 are transferred in the period T3 through charge transfer elements 13 to which the constant potentials are applied to a charge transfer element 13 to which the first clock is applied. In this manner, the solid-state imaging device 10 in the second embodiment supports the intermediate resolution mode and can switch the operation mode between the low resolution mode and the intermediate resolution mode in accordance with the imaging target.

Figure 12:
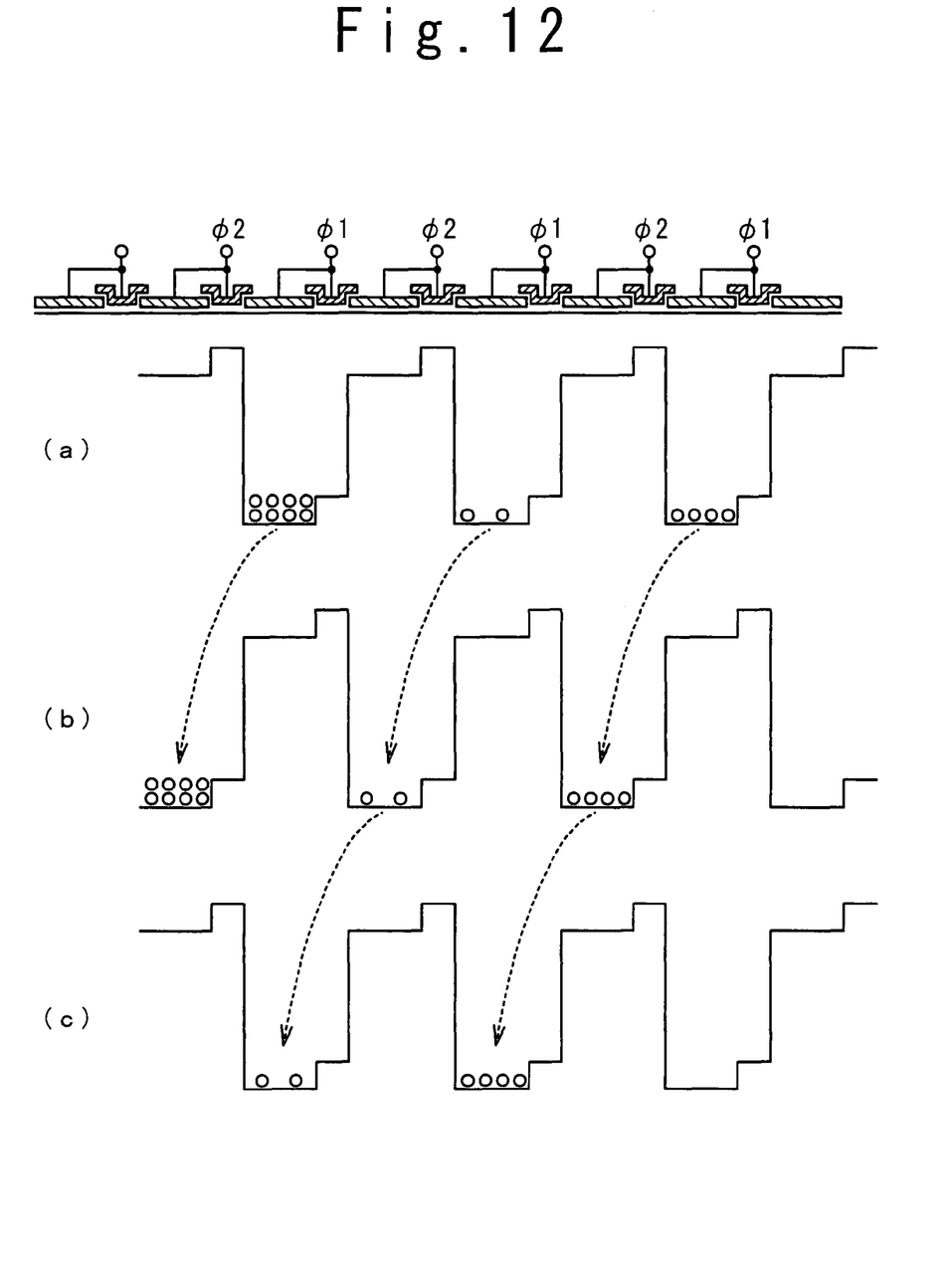
FIG. 12 conceptually shows a charge transfer in a high resolution mode.

It should be noted that the solid-state imaging device 10 according to the above-mentioned first and second embodiments further supports the high resolution mode. FIG. 12 conceptually shows the charge transfer by the CCD 6 in the high resolution mode. In the above-mentioned intermediate resolution mode, the operation clock signals are applied to only the first signal line φ1A and the fourth signal line φ2A, and the number of the transfer electrodes is half the number during the high resolution mode when all the pixels are transferred. Thus, if the driving frequency is the same, the time required for the charge transfer in the intermediate resolution mode is reduced by half.

In the low resolution mode, it is preferable that the charges read out to the charge transfer element 13 connected to a second clock signal line φ2 at the time of the high resolution mode are combined on the register with the charges in the charge transfer element 13 connected to the first clock signal line φ1. Alternatively, the charges may be pulled by an overflow drain (not shown) before the charges are read. In the case when the charges of the second clock signal line φ2 are combined on the register, a channel potential of an element to which a voltage TG (see FIG. 2) is applied is preferably larger than a channel potential with respect to the second electrode 15 to which the voltage of the first direct current power source 35 is applied. If this condition is not satisfied, the voltage of the first direct current power source 35 is increased only when the charges are read.

It is apparent that the present invention is not limited to the above embodiment and may be modified and changed without departing from the scope and spirit of the invention.

What is claimed is:

1. A solid-state imaging device comprising:
   a photo-detection unit that generates charges in response to a received light;
   a charge read-out unit that reads said generated charges;
   a charge transfer unit that transfers said charges read by said charge read-out unit to a charge detection unit in response to a first clock and a second clock; and
   a clock supply circuit that generates said first clock and said second clock,
   wherein said charge transfer unit includes:
   a first charge transfer element;
   a second charge transfer element adjacent to said first charge transfer element;
   a charge transfer element group adjacent to said second charge transfer element and including a plurality of charge transfer elements that are different from said first charge transfer element and said second charge transfer element; and
   another first charge transfer element that is adjacent to said charge transfer element group and is different from said second charge transfer element,
   wherein in a first time period, said clock supply circuit supplies said first clock to said first charge transfer element, said second clock to said second charge transfer element, and constant potentials to respective said plurality of charge transfer elements,
   wherein operation modes of the solid-state imaging device include:
   a low resolution mode; and
   a high resolution mode in which resolution is higher than that in said low resolution mode, and
   wherein in said low resolution mode, four charge transfer elements provided between said second charge transfer element and said another first charge element are said plurality of charge transfer elements.

2. The solid-state imaging device according to claim 1, wherein in a second time period following said first time period, said clock supply circuit supplies an inverted signal of a signal of said first clock during said first time period to said first charge transfer element, an inverted signal of a signal of said second clock during said first time period to said second charge transfer element, and said constant potentials to respective said plurality of charge transfer elements.

3. The solid-state imaging device according to claim 1, wherein said operation modes further includes an intermediate resolution mode in which resolution is higher than that in said low resolution mode and lower than that in said high resolution mode, wherein in said intermediate resolution mode, two charge transfer elements provided between said second charge transfer element and said another first charge element are said plurality of charge transfer elements.

4. The solid-state imaging device according to claim 1, wherein said clock supply circuit has:
   a clock generating unit that generates said first clock and said second clock; and
   a resolution switch unit connected to said clock generating unit,
   wherein said resolution switch unit switches said operation modes in response to a control signal supplied from a control unit.

5. The solid-state imaging device according to claim 1,
   wherein said charge transfer unit is provided with a plurality of pairs of a storage electrode and a barrier electrode, and
   wherein driving pulses of different phases are respectively applied to adjacent pairs of said plurality of pairs, and a driving pulse or a DC voltage is applied to a pair adjacent to said adjacent pairs of said plurality of pairs.

6. The two-phase driving type solid-state imaging device according to claim 5, wherein a number of pairs of said plurality of pairs to which said DC voltage is applied is an integral multiple of two.

7. The two-phase driving type solid-state imaging device according to claim 5, wherein when said charges are supplied from said charge read-out unit to said charge transfer unit, a voltage higher than said DC voltage is applied to said storage electrode to which said DC voltage is applied in said charge transfer.

8. The two-phase driving type solid-state imaging device according to claim 5, wherein an amplitude of said driving voltages applied to said adjacent pairs in a case when said DC voltage is applied to said pair is larger than that when said DC voltage is not applied to said pair.

9. A method of operating a solid-state imaging device comprising:
   (a) generating a first clock and a second clock, wherein said second clock is an inversion clock of said first clock;
   (b) reading charges that are generated by a photo-detector in response to a received light and transferring said charges to a charge transfer unit; and
   (c) transferring said charges to a charge detection unit by said charge transfer unit in response to said first clock and said second clock,
   wherein said charge transfer unit includes:
   a first charge transfer element;
   a second charge transfer element adjacent to said first charge transfer element;
   a charge transfer element group adjacent to said second charge transfer element and including a plurality of charge transfer elements that are different from said first charge transfer element and said second charge transfer element; and
   another first charge transfer element that is adjacent to said charge transfer element group and is different from said second charge transfer element,
   wherein in a first time period, said (c) step includes:
   (c1) supplying said first clock to said first charge transfer element;
   (c2) supplying said second clock to said second charge transfer element; and
   (c3) supplying constant potentials to respective said plurality of charge transfer elements, and
   wherein operation modes of the solid-state imaging device include:
   a low resolution mode; and
   a high resolution mode in which resolution is higher than that in said low resolution mode,
   wherein in said low resolution mode, four charge transfer elements provided between said second charge transfer element and said another first charge element are said plurality of charge transfer elements.

10. The method according to claim 9, wherein in a second time period following said first time period, said (c) step includes:
    (c4) supplying an inverted signal of a signal of said first clock during said first time period to said first charge transfer element;
    (c5) supplying an inverted signal of a signal of said second clock during said first time period to said second charge transfer element; and
    (c6) supplying said constant potentials to respective said plurality of charge transfer elements.

11. The method according to claim 9, wherein said operation modes further includes an intermediate resolution mode in which resolution is higher than that in said low resolution mode and lower than that in said high resolution mode,
    wherein in said intermediate resolution mode, two charge transfer elements provided between said second charge transfer element and said another first charge element are said plurality of charge transfer elements.

* * * * *